May 17, 1960 G. G. GIBNEY 2,936,619
DEVICE FOR MEASURING LIQUID FLOW
Filed July 10, 1958
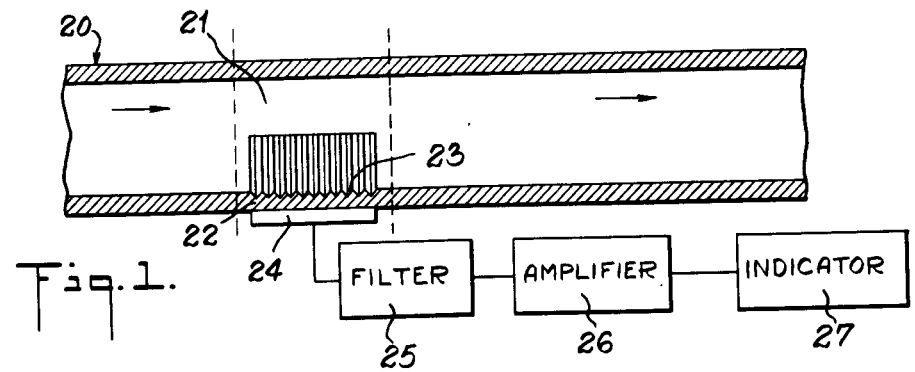
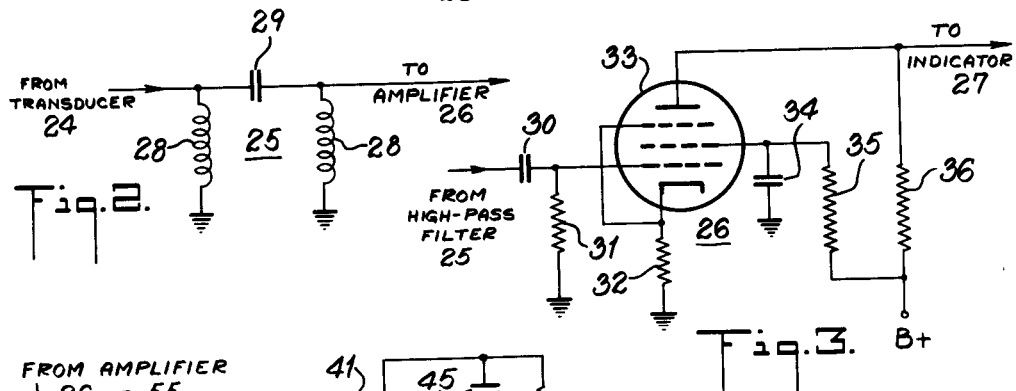
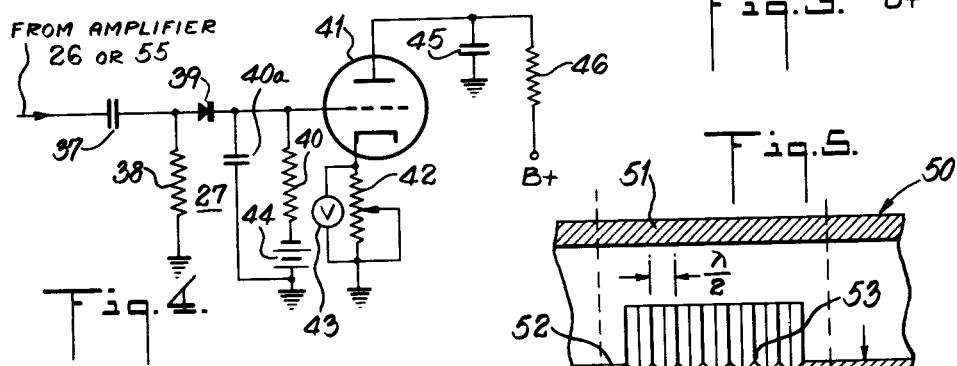
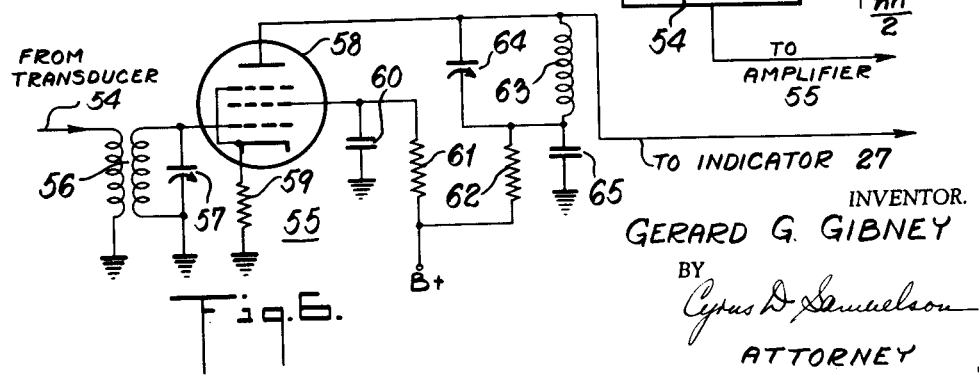
INVENTOR.
GERARD G. GIBNEY
BY
*Cyrus D. Samuelson*
ATTORNEY 2,936,619
Patented May 17, 1960

2,936,619
DEVICE FOR MEASURING LIQUID FLOW

Gerard G. Gibney, Nixon, N.J., assignor to Gulton Industries, Inc., Metuchen, N.J., a corporation of New Jersey Application July 10, 1958, Serial No. 747,675

4 Claims. (Cl. 73—194)

My invention relates to a device for measuring the rate of flow of liquid in a pipe. In particular, my invention is directed toward a device for determining the liquid flow velocity by measuring the amplitude of the sound pressure waves resulting from the kinetic energy of the liquid at the inside wall of the pipe under flow conditions.

It is an important object of my invention to provide a device for measuring the flow velocity of liquid in a pipe by acoustic means.

It is a further object of my invention to provide such a device wherein a broad band of frequencies is employed.

It is a still further object of my invention to provide such a device wherein a narrow band of frequencies is employed.

It is a still further object of my invention to provide such a device which does not introduce any obstructions in the pipe.

Other objects, features and advantages of my invention will be apparent during the course of the following description when taken in conjunction with the accompanying drawings wherein:

Figure 1 is a block schematic diagram of an acoustic flowmeter of my invention showing the pipe in cross-section with close-spaced serrations on the inside wall of a portion of the pipe, Figure 2 is a schematic diagram of a preferred form of high pass filter used in the embodiment of Figure 1, Figure 3 is a schematic diagram of a preferred form of amplifier used in the embodiment of Figure 1, Figure 4 is a schematic diagram of a preferred form of indicator used in acoustic flowmeters of my invention, Figure 5 is a cross-sectional view of a portion of a pipe with wide-spaced serrations on the inside wall of the pipe, and Figure 6 is a preferred form of tunable amplifier which is used in conjunction with the pipe of Figure 5.

In the drawings, wherein, for the purpose of illustration, are shown preferred embodiments of my invention, the numeral 20 designates a pipe in which the liquid flow is in the direction of the arrows of Figure 1. However, it should be noted that flow in the direction opposite to that indicated by the arrows may also be measured with flowmeters of my invention. Pipe section 21 is inserted in pipe 20 and has the same open cross-section as the balance of pipe 20 so that the measuring element does not introduce any variations in the liquid flow. Section 21 may also be an integral part of pipe 20. Section 21 has wall 22 on the inner surface of a portion of which are cut serrations 23. In Figure 1, serrations 23 are closely spaced and are approximately .010″ from one ridge to the next adjacent ridge. If desired, serrations 23 may be formed by crosshatching whereby a plurality of individual crossed ridges are formed and it is within the contemplation of my invention to use either type in the embodiment of Figure 1.

Transducer 24, which may be of natural piezoelectric, magnetostrictive, artificial piezoelectric or any other electromechanically sensitive material, is mounted on the outer surface of wall 22 opposite serrations 23 and closest to the serrations. Transducer 24 is suitably affixed to wall 22 in any manner well known in the art. The electrical output of transducer 24 is fed to filter 25 and thence to amplifier 26 and indicator 27. I prefer to form transducer 24 of a piezoelectric ceramic such as the titanates but transducers formed of other material may be used also.

Filter 25 comprises coils 28 and capacitor 29, connected as shown in Figure 2 and serves to remove any low frequency signals caused by the mechanical vibration of the pipe under flow conditions.

Amplifier 26 is a broad band amplifier with a frequency range, of for example, 1000 cycles to 10 megacycles utilizing vacuum tube 33 to whose control grid signal is applied from filter 25 through coupling capacitor 30. Resistor 31 in combination with cathode resistor 32 determines the bias on the grid of tube 33. Capacitor 34 is the screen grid by-pass capacitor, resistor 35 is the screen grid dropping resistor and resistor 36 is the plate load resistor.

Indicator 27 receives signals from amplifiers 26 or 55 through coupling capacitor 37. Resistors 38 and 40 are load resistors and rectifier 39 serves to apply only positive signals to the grid of vacuum tube 41 which is biased to cut-off with no liquid flow by means of battery 44. Capacitor 40a filters the rectified signal and variable calibrating resistor 42, is the cathode resistor. Under some conditions, resistor 42 may be a fixed resistor. Voltmeter 43 measures the voltage drop across resistor 42 which voltage is proportional to the liquid flow. Capacitor 45 is a plate by-pass capacitor and resistor 46 is the plate decoupling resistor.

Pipe 50 contains pipe section 51 which is continuous therewith and contains serrations 53 on the inner surface of pipe wall 52. Transducer 54, which is similar to transducer 24, is affixed to the outer surface of wall 52 in the usual manner. The distance between adjacent ridges of serrations 53 is equal to $$\frac{\lambda}{2}$$

(a half wavelength) which is determined by the formula $$\frac{V}{2f}$$

where $V$ is the velocity of sound in the pipe material and $f$ is the desired frequency of operation. The thickness of pipe wall 52 is equal to $$\frac{n\lambda}{2} \text{ or } \frac{nV}{2f}$$

where $n$ is an integer. In this embodiment, the flowmeter operates on a narrow band of frequencies.

The output of transducer 54 is fed to amplifier 55 whose input is transformer 56. The secondary of transformer 56 is tuned by means of capacitor 57 and the signal from the tuned circuit is applied to the grid of vacuum tube 58. Resistor 59 is the cathode bias resistor, resistor 61 is the screen grid dropping resistor and capacitor 60 is the screen grid by-pass capacitor. Resistor 62 is the plate decoupling resistor, capacitor 65 is the plate by-pass capacitor and coil 63 and capacitor 64 together make up the tuned plate circuit of vacuum tube 58. The output of amplifier 55 is fed to indicator 27.

It should be understood that other circuits may be used and that those described herein are merely examples of circuits which have been employed as a part of flowmeters of my invention.

Considering first the embodiment illustrated in Figures 1 through 4, when there is liquid flow in pipe 20, the liquid passes over serrations 23 and the kinetic energy of the liquid is transformed into sound pressure waves. These waves are transmitted through pipe wall 22 and impinge on transducer 24. Transducer 24 transforms the sound pressure waves into electrical voltages proportional thereto which are amplified, rectified and applied to an indicating circuit. The sound energy results from the impact of the liquid on serrations 23 and this energy increases as the rate of flow increases.

Serrations 23 are closely spaced and are, for example, .010" apart from ridge to ridge which results in a broad band of frequencies being produced. I have discovered that transducer 24 may be resonant at frequencies between 500 kc. and 2500 kc. with good results. This is due to the fact that the transducer is responsive to the fundamental frequency to which it is resonant and to the odd harmonics of the fundamental. Secondly, the Q of the transducer used is low enough so that the transducer responds to energy in small bands of frequencies around its fundamentals and odd harmonics. Since there is a wide band of sound frequencies present at the transducer under flow conditions, the frequency response characteristics of the transducer are not critical.

The output of transducer 24 is fed to high pass filter 25. Figure 2 illustrates a preferred form of high pass filter with values, for example, as follows: coils 28: 60 millihenries, capacitor 29: .1 microfarad, cut-off frequency: 1000 cycles. Filter 25 serves to remove any low frequency rumble due to the mechanical vibration of the pipe 20 during liquid flow.

Signals from filter 25 are coupled to the grid of tube 33 by means of capacitor 30. Amplifier 26 has a gain of approximately 400 and its output is coupled to rectifier 39 through capacitor 37. Tube 41 is biased to cut-off by battery 41 when there is no fluid flow and with fluid flow, the signals from amplifier 26 are rectified by rectifier 39 so that positive signals are applied to the grid of tube 41. This overcomes the cut-off bias and causes current to flow in the plate-cathode circuit of tube 41. This current flow causes a voltage drop across resistor 42 which is indicated on voltmeter 43. It can be seen that as the voltage applied to the grid of tube 41 is increased, the indication on voltmeter 43 is increased and as the voltage applied to the grid of 41 is directly related to the sound intensity generated by the liquid flow, the display on voltmeter 43 is proportional to the liquid flow velocity.

Flowmeters of my invention may be calibrated using known flows so that voltmeter 43 gives a direct indication in volume or mass per unit time.

The flowmeter illustrated in Figures 5 and 6 operates by producing a narrow band of sound frequencies. This is accomplished by making the distance from one ridge of serrations 53 to the adjacent ridge equal to a half wavelength at the frequency being used. The distance is given by the formula $$\frac{V}{2f}$$

In addition, to obtain good transmission through pipe wall 52, the thickness dimension of wall 52 is an integral multiple of the distance between adjacent ridges. Transducer 54 is chosen with a resonant frequency at $f$ so that it responds best to the narrow frequency band surrounding frequency $f$. The output of transducer 54 is coupled to amplifier 55 by means of coupling transformer 56 whose secondary is tuned to frequency $f$ by means of capacitor 57. The output circuit of tube 58 is tuned by means of coil 63 and variable capacitor 64. The output of amplifier 55 is fed to indicator 27 whose operation has been explained heretofore.

By way of illustration and not by way of limitation, following is an example of a narrow band flowmeter of my invention:

Liquid: water
Pipe material: stainless steel
Pipe diameter: 3"
Pipe length: 6"
Serration separation: .103"
Pipe wall thickness: .206"
Frequency: 1 megacycle
Transducer: barium titanate 1" disc mounted on flat area on outside of pipe
Resonant frequency: 1 megacycle
Range of flow velocities measured: 0 to 980 gallons per minute It can be seen that flowmeters of my invention possess the following advantages, among others:

(1) A continuous pipe may be used so that no correction is required to compensate for obstructions placed in the pipe or flow-conducting conduit.

(2) Any liquid flow, whether corrosive or otherwise, may be measured since no equipment is placed in the liquid stream.

(3) By proper choice of high or low temperature transducers, high or low temperature liquid flow may be measured.

(4) Since the sound is not transmitted in the liquid, the flow of high sound attenuation liquids may be measured.

(5) Will measure flow in partially filled pipes.

(6) Will average the flow of nonhomogeneous liquids.

(7) Is not dependent on type of material used for pipe.

(8) Measures wide range of flow velocities.

(9) The simple circuits used lend themselves to telemetered or other types of remote control operation.

My invention also lends itself to the measurement of flow when there is no straight section of pipe before and after the section to which the transducer is attached. Since the sound output depends on the liquid flow velocity and the liquid density, it is necessary to have the liquid move past the transducer in a uniform cross-section. This occurs when there is sufficient straight section of pipe on either side of the transducer. However, when the flow is to be measured in a pipe which has no straight sections, it is advisable to place a plurality of transducers around the pipe circumference and average the several velocities observed to obtain the value of the average flow velocity.

While I have disclosed my invention in relation to specific examples and in specific embodiments, I do not wish to be limited thereto, for obvious modifications will occur to those skilled in the art without departing from the spirit and scope of my invention.

Having thus described my invention, I claim:

1. An acoustic flowmeter for measuring the flow of liquid in a pipe comprising a pipe section continuous with the remainder of the pipe in which the liquid flow is being measured, a portion of the inner surface of said pipe section carrying serrations thereon, an electromechanical transducer mounted on the outer surface of said pipe section such that said transducer is close to said serrations and separated therefrom by the wall of said pipe section, amplifying means and indicating means, the output of said transducer being connected to said amplifying means and thence to said indicating means, the distance between adjacent ridges of said serrations being equal to $$\frac{V}{2f}$$

wherein V is the velocity of sound in the pipe material and $f$ is a signal frequency to which said transducer is responsive, said amplifier being capable of amplifying signals of said signal frequency $f$, the thickness of the wall of said pipe section being an integral multiple of the distance between adjacent ridges of said serrations.

2. An acoustic flowmeter for measuring the flow of liquid in a pipe comprising a pipe section continuous with the remainder of the pipe in which the liquid flow is being measured, a portion of the inner surface of said pipe section carrying serrations thereon, an electromechanical piezoelectric ceramic transducer mounted on the outer surface of said pipe section such that said transducer is close to said serrations and separated therefrom by the wall of said pipe section, a tunable amplifier and indicating means, the output of said transducer being connected to said tunable amplifier and thence to said indicating means, the distance between adjacent ridges of said serrations being equal to $$\frac{V}{2f}$$

wherein V is the velocity of sound in the pipe material and $f$ is a signal frequency to which said transducer is responsive, said tunable amplifier being tunable to said signal frequency $f$, the thickness of the wall of said pipe section being an integral multiple of the distance between adjacent ridges of said serrations.

3. An acoustic flowmeter as described in claim 2 wherein said transducer is composed largely of titanate.

4. An acoustic flowmeter as described in claim 2 wherein said indicating means comprises a rectifier and a vacuum tube, the output of said rectifier being connected to said vacuum tube which is biased to cut-off when there is no flow of liquid in the pipe, said rectifier being connected to said vacuum tube such that said tube is not cut off when there is a flow of liquid in the pipe, and means for indicating the flow of current in the plate-cathode circuit of said vacuum tube.

References Cited in the file of this patent

UNITED STATES PATENTS

| | | |
|---|---|---|
| 1,935,445 | Heinz | Nov. 14, 1933 |
| 2,047,529 | Turk | July 14, 1936 |
| 2,492,371 | Sivian | Dec. 27, 1949 |
| 2,492,493 | Misson | Dec. 27, 1949 |
| 2,627,543 | Obermaier | Feb. 3, 1953 |